(12) United States Patent
Tsui

(10) Patent No.: US 9,636,786 B2
(45) Date of Patent: May 2, 2017

(54) LOCATOR BUSHING MECHANISM FOR MODULAR WELDING TABLES

(71) Applicant: Gary Tsui, San Marino, CA (US)

(72) Inventor: Gary Tsui, San Marino, CA (US)

( * ) Notice: Subject to any disclaimer, the term of this patent is extended or adjusted under 35 U.S.C. 154(b) by 0 days.

(21) Appl. No.: 14/867,813

(22) Filed: Sep. 28, 2015

(65) Prior Publication Data
US 2017/0087673 A1 Mar. 30, 2017

(51) Int. Cl.
F16B 35/02 (2006.01)
B23K 37/04 (2006.01)
F16B 5/02 (2006.01)

(52) U.S. Cl.
CPC ........ *B23K 37/0461* (2013.01); *F16B 5/0208* (2013.01); *F16B 5/0225* (2013.01)

(58) Field of Classification Search
CPC .... F16B 5/0208; F16B 5/0216; F16B 5/0225; F16B 5/0283; F16B 35/02; F16B 34/145; B23K 37/0461
USPC .... 411/353, 383, 384, 386, 517, 546; 16/2.1
See application file for complete search history.

(56) References Cited

U.S. PATENT DOCUMENTS

| | | | | |
|---|---|---|---|---|
| 2,700,172 A * | 1/1955 | Rohe | ......................... | F16B 5/01 16/2.1 |
| 3,037,542 A * | 6/1962 | Boyd | ..................... | F16B 5/0208 411/105 |
| 3,041,913 A * | 7/1962 | Liska | ..................... | F16B 5/0208 285/148.27 |
| 3,455,362 A * | 7/1969 | Mohrman | ................ | F16B 4/004 411/103 |
| 3,540,128 A * | 11/1970 | Giles | ....................... | B23Q 3/103 269/302 |
| 3,977,146 A * | 8/1976 | Wiley | ........................ | F16B 5/01 16/2.1 |
| 4,310,963 A * | 1/1982 | Blumle | ................... | B23Q 3/103 156/305 |
| 4,878,795 A * | 11/1989 | Woodrow | .................. | F16B 5/01 411/183 |
| 5,362,036 A * | 11/1994 | Whiteman | .......... | B23K 37/0461 269/303 |
| 5,802,780 A * | 9/1998 | Hammerschlag | ....... | A47B 47/00 403/200 |
| 6,264,412 B1 * | 7/2001 | Nakamura | ................. | F16B 5/01 411/107 |
| 7,891,927 B2 * | 2/2011 | Burger | ................... | F16B 5/0233 411/383 |
| 8,065,967 B2 * | 11/2011 | Wong | .................. | B23K 37/0461 108/155 |
| 8,171,690 B2 * | 5/2012 | Ghatikar | .............. | E04F 13/0837 403/267 |
| 9,578,959 B2 * | 2/2017 | Isgr | ....................... | A47B 13/088 |
| 2008/0047095 A1 * | 2/2008 | Weiss | ..................... | F16C 11/045 16/2.1 |

* cited by examiner

Primary Examiner — Roberta Delisle
(74) Attorney, Agent, or Firm — Jen-Feng Lee, Esq.

(57) ABSTRACT

The present invention will improve the efficiency of setting up a modular welding table by reducing the time it takes to properly aligning the plates on top of the frames, thanks to the design features of a tapered flange and a cylindrical protrusion as described and disclosed herein. Another advantage of implementing the design disclosed herein is that the plates can have double its useful life, if one side's surface get worn out, the plates can be flipped over and use the other side's surface.

3 Claims, 7 Drawing Sheets

LOCATOR BUSHING MECHANISM FOR MODULAR WELDING TABLES

FIELD AND BACKGROUND OF THE INVENTION

The present invention relates to a locator bushing for modular welding tables.

Referring to FIGS. 1 and 2 for currently available prior art products and the way the products are used.

Modular welding tables generally contain some removable plates that are fixed on top of frames. On each plate 21, there are a number of mounting holes 23 for the mounting of the plate to the frame 22 by screws 24. The diameter of each mounting hole 23 is a little bit bigger than the diameter of screw 24. On one side of each mounting hole 23, there is a recess area 25 with diameter a little bit bigger than the diameter of the head of screw 24. To fix a plate 21 to frame 22 of the welding table, one has to align roughly all the mounting holes 23 to the threaded holes 26 on frame 22 first, and insert each screw 24 through each mounting hole 23 of the plate 21 to each threaded hole 26. Most of the time, the alignment may not be good for all the mounting holes 23 at the first trial. So one has to reposition each plate 21 bit by bit until all the screws 24 are inserted to the corresponding threaded holes 26 on frame 22 properly. All the screws 24 can then be finger tightened.

After all the plates 21 are mounted on frame 22, one has to use special alignment tool to check the alignment of these plates 21 relative to each other. Minor adjustments of the alignment of each plate 21 have to be performed due to the end-play between each screw 24 and each mounting hole 23. When desired alignment is achieved for a plate 21, the screws 24 can be tightened. Completing the alignment for all the plates 21 will be a time consuming process, before the plates are all aligned properly and ready for use.

The present invention will improve the efficiency of setting up a modular welding table by reducing the time it takes to properly aligning the plates on top of the frames, thanks to the bushing locator design as described and disclosed herein.

Another advantage of implementing the design disclosed herein is that the plates can have double its useful life, if one side's surface get worn out, the plates can be flipped over and use the other side's surface.

SUMMARY OF THE INVENTION

Present invention disclosed a cylindrical bushing locator, with its particular shape and configuration, and the corresponding screws and plates, allows for easy alignment of the plates when setting on top of the frames of welding tables.

The cylindrical bushing has a slightly larger tapered flange at the upper end and a cylindrical protrusion at the lower end. When a cylindrical bushing is inserted into a mounting hole on a table frame, until it is stopped by the surface of table frame, adjust the position of plate slightly in any direction until the protrusion drops into the upper portion of screw hole.

When the protrusion drops in, that means mounting hole is roughly in good alignment with a corresponding screw hole. As such, to properly align the plates to the frames of a welding table is made easier and more efficient, by the structure of the protrusion on the locator bushing disclosed herein.

The mounting holes of the plates are made to be symmetrical on both the upper surface and the bottom surface.

If the upper surface of the plates is worn out after extended time of usage, the plates can be turned over and use the bottom surface instead. Consequently, the present invention will double the workable life of each plate of a modular welding table.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

Figure 1:
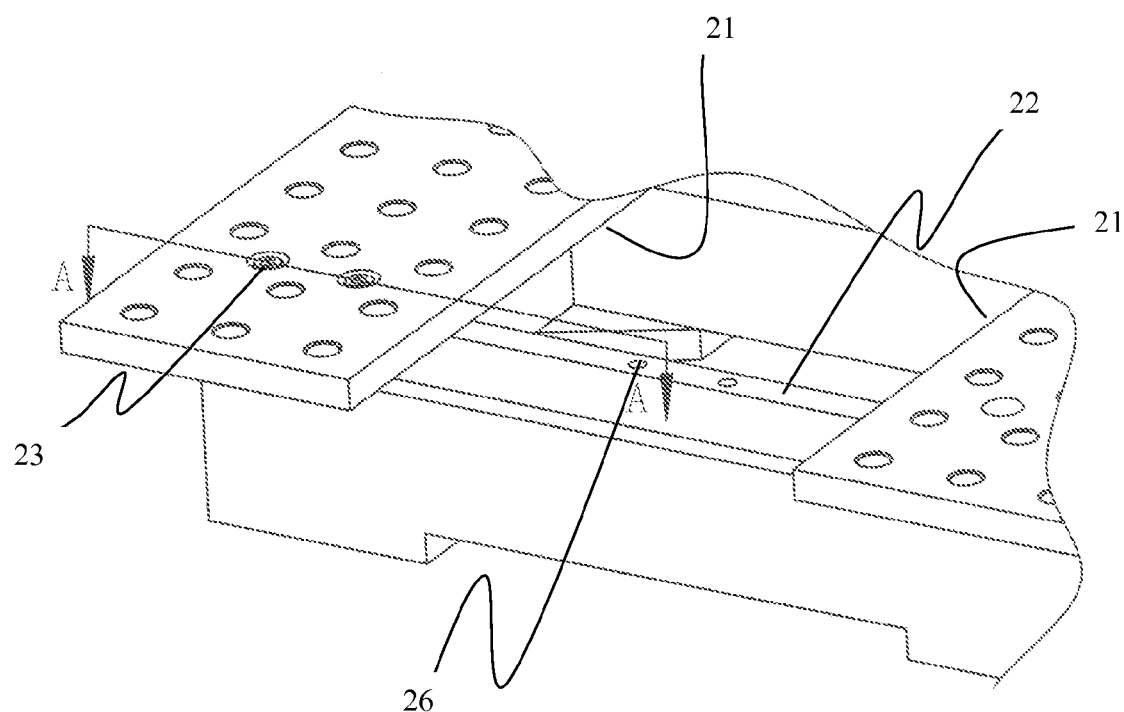
FIG. 1 shows the prior art mechanism for securing plates to the frame of a welding table.
Figure 2:
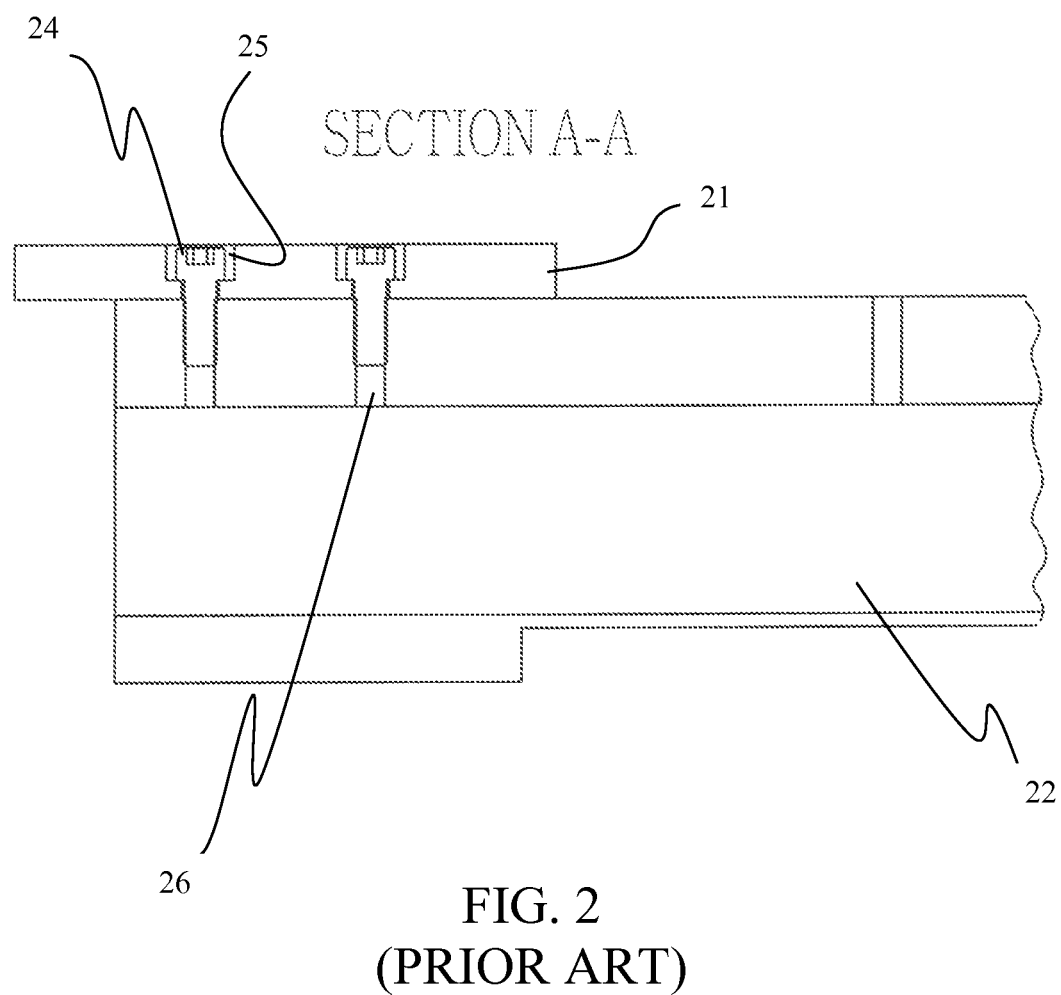
FIG. 2 shows the sectional view (A-A line noted in FIG. 1) of the prior art mechanism.
Figure 3:
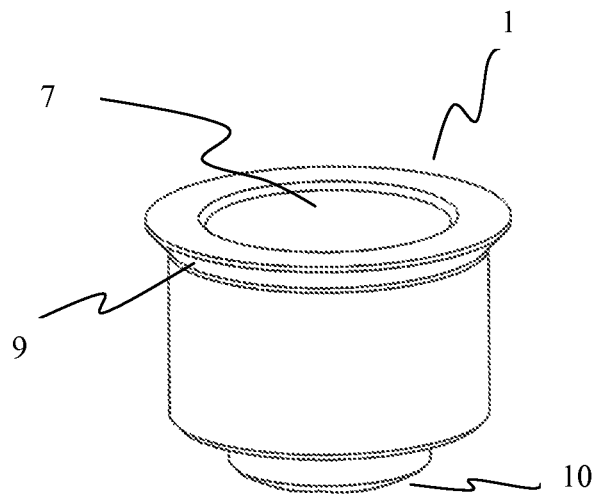
FIG. 3 shows the side view of the cylindrical bushing of the present invention.
Figure 4:
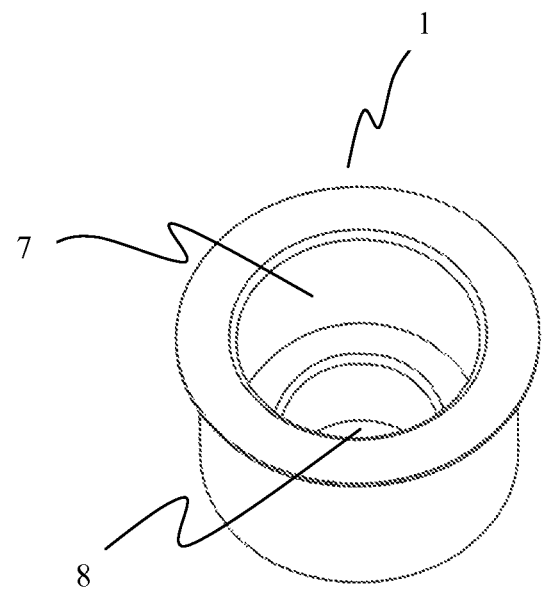
FIG. 4 shows, more from the top, of the side view of the cylindrical bushing of the present invention, with the features of the recess portion and the through hole noted.
Figure 5:
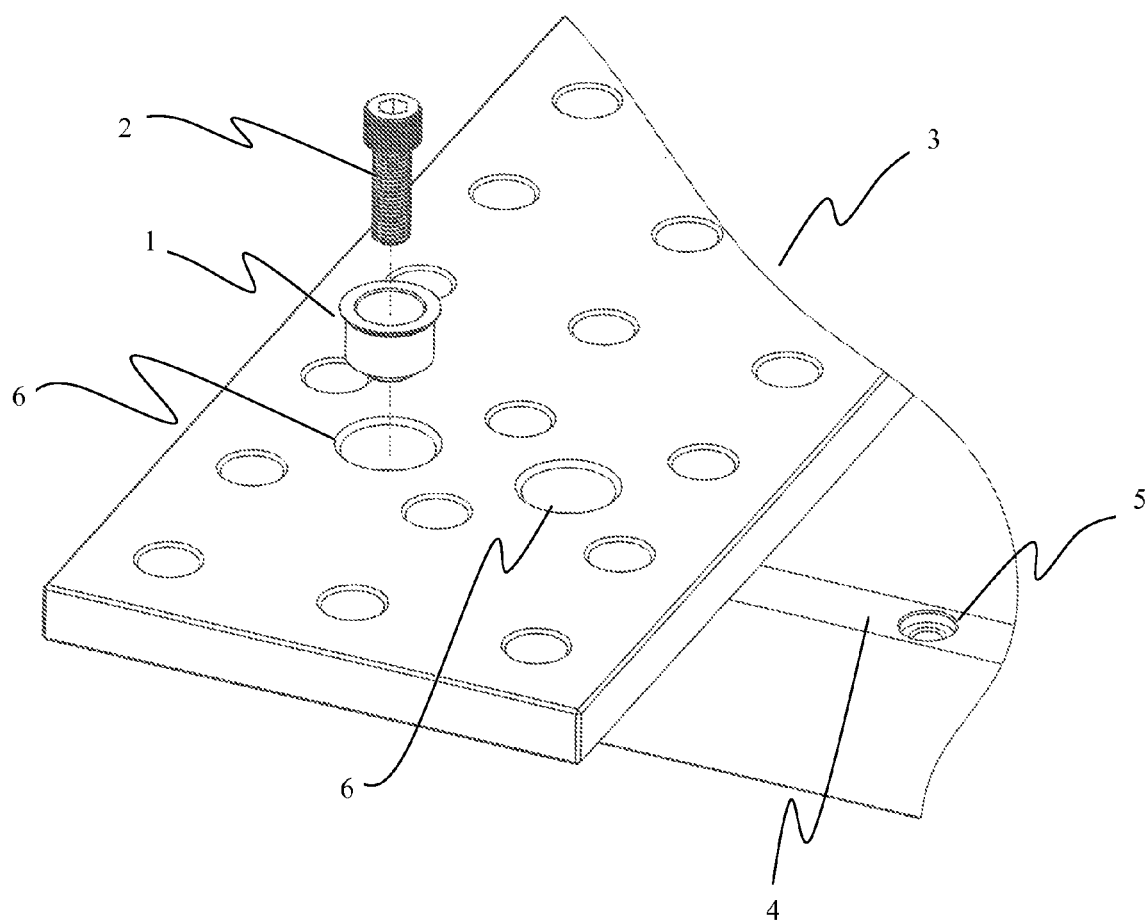
FIG. 5 shows an exploded cutout view of the cylindrical bushing, the screw and the plate, relative to the frame of a welding table.

FIGS. 3 and 4 show the views of the cylindrical bushing 1 of the locator bushing mechanism in the present invention.

The cylindrical bushing 1 has a slightly larger tapered flange 9 at the upper end of the bushing 1 and a cylindrical protrusion 10 at the lower end of the bushing 1. As shown in the figures, the diameter of the cylindrical protrusion 10 is smaller than that of the main body of the cylindrical bushing 1, while the diameter of the tapered flange 9 is larger than that of the main body of the cylindrical bushing 1. Along the center axial direction of the cylindrical bushing 1, a cylindrical recess portion 7 is made at the upper end and a cylindrical through hole 8 is made at the lower end.

FIG. 5 through FIG. 8 serve to explain how the locating function of the bushing works in present invention. To assemble a plate 3 on welding table frame 4, the plate 3 is laid on top of table frame 4 with mounting hole 6 aligned with one of the screw hole 5 roughly. Each screw hole 5 (on the table frame 4) composes of two portions: the upper portion is a cylindrical hole and the lower portion is a threaded hole with smaller diameter.

Insert a cylindrical bushing 1 into a mounting hole 6 on table frame 4 until it is stopped by the surface of table frame 4, adjust the position of plate 3 slightly in any direction until the protrusion 10 drops into the upper portion of screw hole 5 (that means mounting hole 6 is roughly in good alignment with screw hole 5).

When the protrusions 10 of all the cylindrical bushings 1 drop into the upper portions of the corresponding screw holes 5, it means that plate 3 is roughly in good alignment with all screw holes 5 of table frame 4. Then insert a screw 2 through the recess portion 7 and hole 8 to the threaded hole of each screw hole 5, finger tight screws 2.

The nut portion of the screw 2 is sized to fit inside the cylindrical recess portion 7 and its threaded stem portion is sized to fit to threaded pattern on the inner surface of the screw hole 5 on the fame 4.

Since both the top and bottom edges of mounting hole 6 are made to have a tapered surface matching the tapered flange 9 of cylindrical bushing 1, tightening screws 2 will self-align plate 3 to screw holes 5. That means plate 3 will be in good alignment with all screw holes 5 of table frame 4 after all screws 2 are finger tightened.

Figure 6:
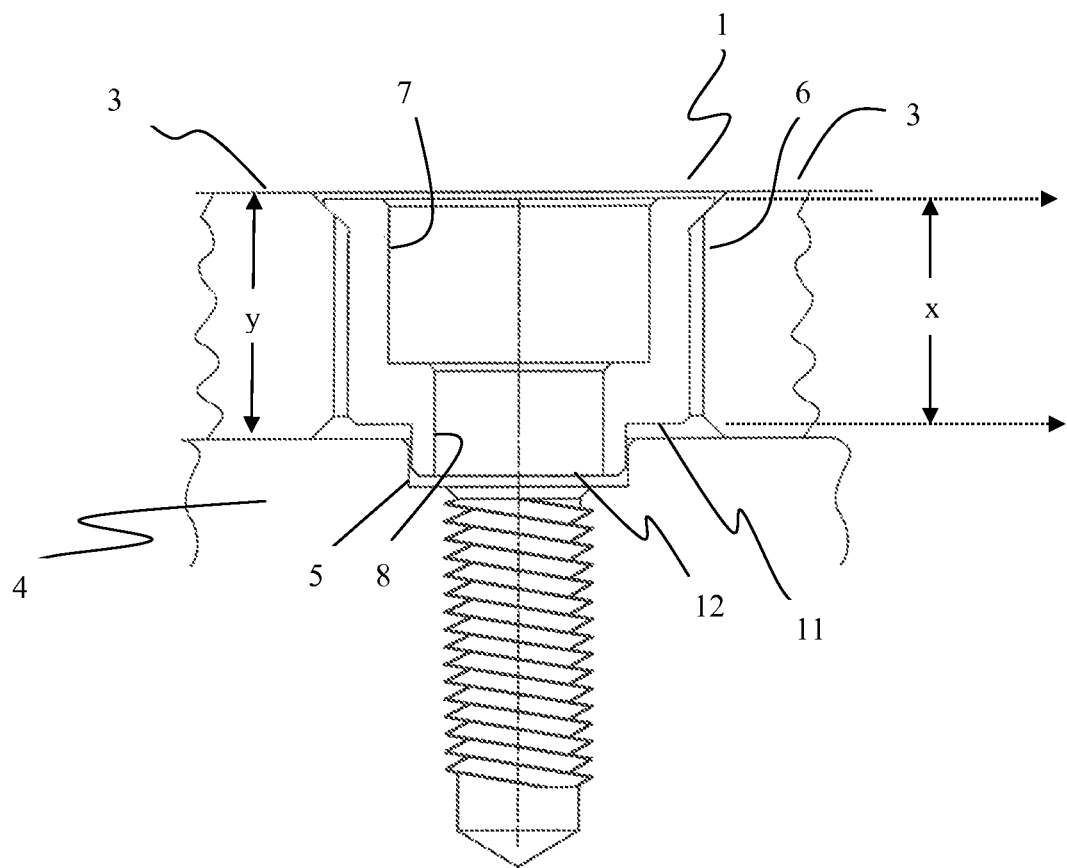
FIG. 6 shows the sectional side view of the cylindrical locator bushing.
Figure 7:
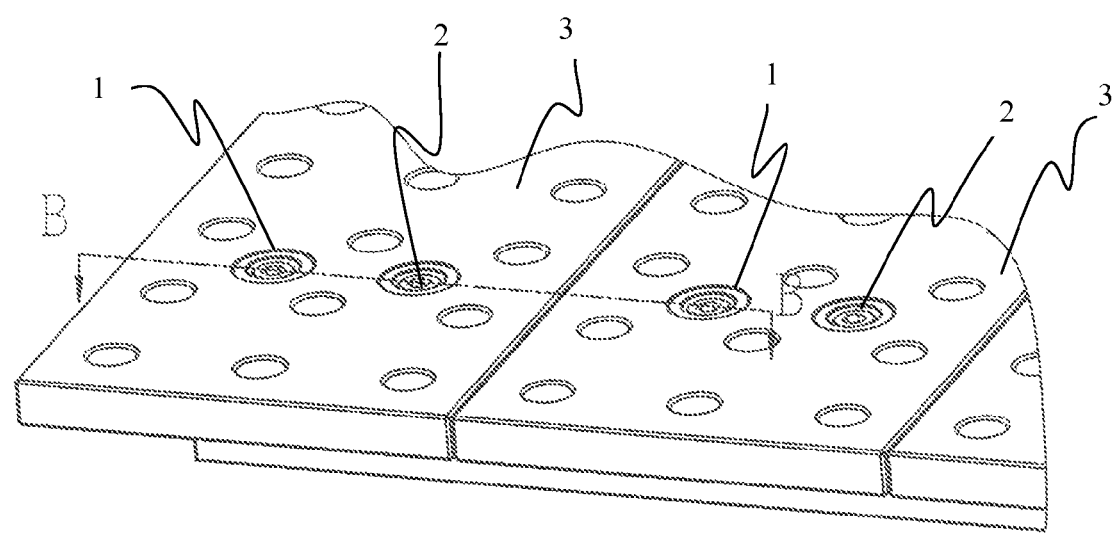
FIG. 7 shows the locator bushing fitted into the plates and securing to a frame underneath.
Figure 8:
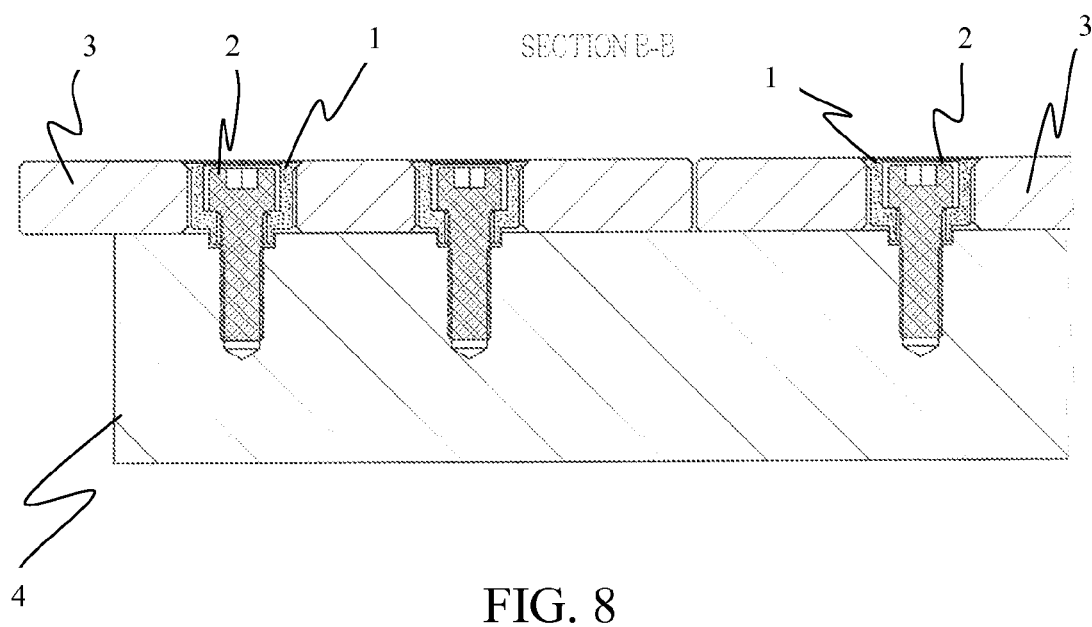
FIG. 8 shows the sectional side view of the bushing fitted into the plates, along the B-B line noted in FIG. 7.

As shown in FIG. 6, the height x of cylindrical bushing 1 is smaller than the thickness y of plate 3 so that there is a gap between surface 11 of cylindrical bushing 1 and top surface of table frame 4; there is also a gap between bottom surface 12 of protrusion 10 and the surface of screw hole 5. This design will ensure that plate 3 can be fixed to table frame 4 with screw 2 through tapered flange 9 of cylindrical bushing 1.

Following the same steps, mount each plate 3 on table frame 4 accordingly. Then all the plates 3 should be in good alignment with each other. Using an alignment tool, perform some minor adjustments on each plate 3 if necessary. Full alignment of all plates 3 can be achieved and all the mounting screws 2 can be tightened.

Using the present invention, the assembling and alignment of the plates 3 on welding table frame 4 should be much easier than the existing design. It will save a lot of assembling time too.

As shown in FIG. 6, the mounting hole 6 of plate 3 is made to be symmetrical on both the upper surface and the bottom surface. If the upper surface of plate 3 worn out after using for a long time, plate 3 can be turned over and use the bottom surface instead. The present invention will double the workable life of each plate 3 of a modular welding table.

What is claimed is:

1. A locator bushing mechanism for modular welding tables, comprising, a locator bushing mechanism configured to engage to a welding table, wherein the locator bushing mechanism comprises:

a cylindrical bushing further having a larger tapered flange at the upper end and a cylindrical protrusion at the lower end, wherein the cylindrical protrusion at the lower end has a smaller diameter than the cylindrical bushing;

a cylindrical recess portion is made at the upper end and a cylindrical through hole is made at the lower end, said recess portion and said through hole is made along the axial direction of said cylindrical bushing;

a screw with its nut portion sized to fit inside the cylindrical recess portion and its threaded stem portion sized to fit inside the through hole portion, wherein the screw engages the welding table; and wherein the height of said cylindrical bushing is smaller than the thickness of a plate of a modular welding table, creating a gap between the surface of said cylindrical bushing and top surface of a table frame.

2. The locator bushing mechanism for modular welding tables of claim 1, further comprising:

a corresponding frame having a plurality of screw holes, each of said screw hole including an upper portion being shaped to receive the cylindrical protrusion of said cylindrical bushing, and a lower portion containing threaded pattern to receive said screw, wherein the screw holes are mounting holes, wherein the mounting holes have to and bottom edges made with a tapered surface matching the larger tapered flange of the cylindrical bushing.

3. The locator bushing mechanism for modular welding tables of claim 1, further comprising:

a plurality of plates, each of said plurality of plates having a plurality of holes sized to receive said cylindrical bushing, so that when said cylindrical bushing is fitted into a hole on a plate, a top surface of said tapered flange will be generally flush with a top surface of said plate.

* * * * *

UNITED STATES PATENT AND TRADEMARK OFFICE
CERTIFICATE OF CORRECTION

PATENT NO. : 9,636,786 B2
APPLICATION NO. : 14/867813
DATED : May 2, 2017
INVENTOR(S) : Gary Tsui Page 1 of 1

It is certified that error appears in the above-identified patent and that said Letters Patent is hereby corrected as shown below:

In the Claims

Column 4, Line 29: "to and bottom edges" should be --top and bottom edges--.

Signed and Sealed this
Twenty-eighth Day of May, 2019

Andrei Iancu
*Director of the United States Patent and Trademark Office*